INVENTOR.
ROBERT W. GUNDLACH

Sept. 22, 1964  R. W. GUNDLACH  3,149,931
XEROGRAPHIC VAPOR FUSING APPARATUS
Filed Sept. 4, 1962  2 Sheets-Sheet 2

INVENTOR.
ROBERT W. GUNDLACH
BY
ATTORNEY

United States Patent Office 3,149,931
Patented Sept. 22, 1964

3,149,931
XEROGRAPHIC VAPOR FUSING APPARATUS
Robert W. Gundlach, Victor, N.Y., assignor to Xerox Corporation, Rochester, N.Y., a corporation of New York
Filed Sept. 4, 1962, Ser. No. 221,150
8 Claims. (Cl. 34—155)

This invention relates to improved apparatus for fusing powder images onto the surface of support material. More particularly, the invention relates to xerography and to apparatus for vapor fusing of powder images loosely formed xerographically onto a support web.

In the process of xerography, as first disclosed, for example, in Carlson U.S. Patent 2,297,691, a previously formed electrostatic latent image on the surface of a xerographic plate is rendered visible by developing with a powder deposited on the plate surface. Commercial forms of powder used for developing are usually of a pigmented resin such as disclosed in Rheinfrank et al. U.S. Patent 2,788,288 and Carlson U.S. Patent Reissue 25,136. The powder image thus formed is then affixed to the surface upon which it has been deposited or onto the surface of another support material to which it may have been transferred by techniques known to those skilled in the art.

Conventionally, there are two usual methods by which a powder image is affixed. The first of these methods is with the application of heat in which case the powder image or its support must be formed of a thermo-responsive material, such as a heat fusible resin, which flows without image distortion when heated and coalesces when cooled to ambient temperature. The second of these methods is to introduce the image-bearing support material into an atmosphere of the vapor of a solvent for the developing powder as disclosed in Carlson U.S. Patent 2,776,907. In the solvent vapor process, the powder image is rendered a tacky cohesive mass while in the presence of the atmosphere of solvent vapor and while still tacky is removed to ambient air for evaporation of the solvent, leaving the image bonded to the support member. The solvent vapor process is referred to as "vapor fixing."

While heat fusing has been put to practical use, certain difficulties have been encountered and particularly in automatic machines. For example, most commercially marketed machines employ a thin layer of vitreous selenium as the photoconductor. Continuous heat exposure is known to have a deleterious effect on the photoconductive properties of selenium. Dissipation or insulation of the heat, therefore, must be carefully controlled. When the image is to be fused to paper, cellulose acetate, or other base having a relatively low charring or combustion temperature, as is usually the case, the powder must be made of material which becomes adhesive at a temperature below that which will cause damage to the base. This imposes limitations on the choice of resins which make it difficult to meet other desirable characteristics in the powder composition. In addition, certain paper stocks such as used in record controlled accounting cards have controlled moisture contents which are decreased at high temperature destroying the cards for their intended purpose. Moreover, it has become difficult to reach an entirely satisfactory design of heat fuser with regard to a short warm-up time, low electric current requirements, adequate heat insulating and uniform heat distribution without the attendant disadvantages of fire hazard associated with fusers employing heat as the fusing media.

Vapor fixing of powder images by means of a solvent vapor has also been put to a practical use and found to form dense, blacker images than formed by heat fusing. However, most solvents suitable for use in conjunction with the resins generally used in toners are characterized by various orders of undesirability such as obnoxious odor, toxicity, etc. In general, operation of vapor fusing devices includes removal or emergence of the image bearing support surface from the vapor chamber accompanied by "vapor dragout," i.e., a volume layer of solvent vapor accompanying and accelerated by the moving support surface. This dragout not only has contributed to the inefficiency of the system but its effect on air dilution has caused general uncomfortableness for the operators of the apparatus in attendance not to mention the inherent toxic dangers. Where there is likely to be large volumes of copy to be fused, as is usual with automatic xerographic machines operated continuously, expensive and bulky ventilation equipment has been required to avoid atmospheric contamination. Vapor fusing apparatus, therefore, has in general encountered restricted and intermittent use and has generally been employed only on low volume output equipment.

Now in accordance with the instant invention, there is provided improved apparatus employing fusing in a continuous fusing operation particularly suited for automatic xerographic apparatus.

It is, therefore, an object of the invention to provide novel apparatus for vapor fixing of powder images onto surfaces of support material on which the powder image is loosely supported.

It is a further object of the invention to provide improved vapor fixing apparatus for continuous fixing of xerographic powder images to moving support material.

It is a further object of the invention to achieve vapor fixing of xerographic powder images by improved apparatus resulting in substantially reduced solvent consumption and vapor dragout as compared to other such devices of the prior art.

It is a still further object of the invention to provide novel, continuously operative vapor fusing apparatus in which vapor dragout to ambient atmosphere is substantially eliminated by means of a controlling shroud.

These and other objects will appear clearly in the following specification when read in connection with the drawings, the novel features being pointed out in the claims at the end of the specification.

Figure 1:
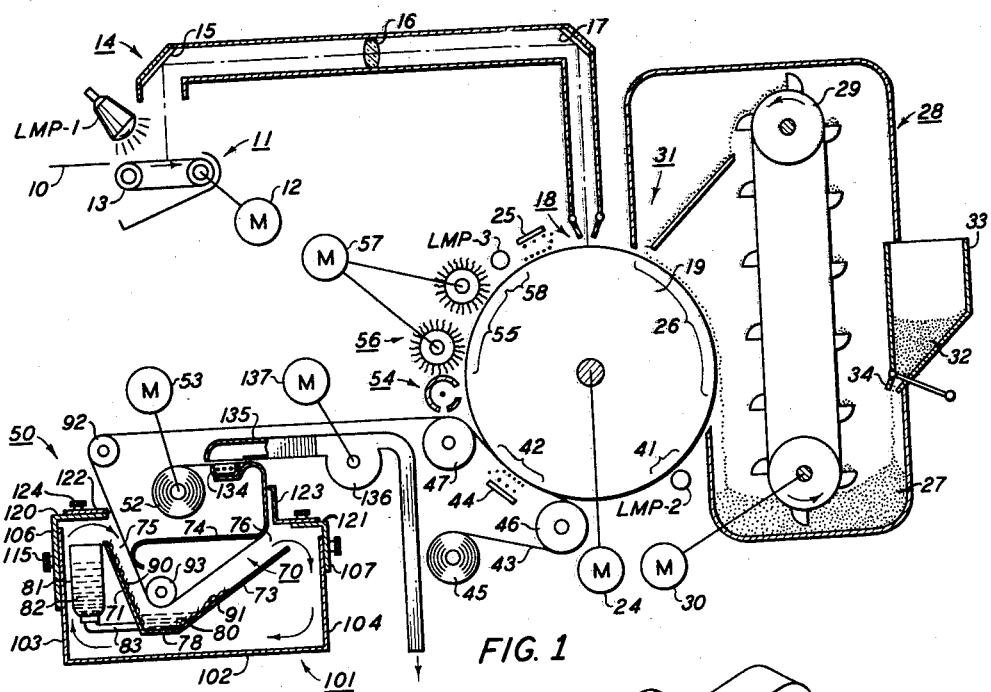
FIG. 1 is a schematic arrangement of an automatic xerographic apparatus incorporating the fuser apparatus of the invention.

For a general understanding of the xerographic processing system by which the invention is being illustrated, reference is had to FIG. 1 in which the various system components are schematically illustrated. As in most xerographic systems based on the concept disclosed in the above-cited Carlson patent, a light radiation image of copy to be reproduced is projected onto the sensitized surface of a xerographic plate to form an electrostatic latent image. Thereafter, the latent image is usually developed with oppositely charged developing material to form a xerographic powder image, corresponding to the latent image, on the plate surface. In one common system of the reusable type, i.e., one in which the xerographic plate is recycled, the powder image is then generally electrostatically transferred to a support surface to which it is usually fused by a fusing device causing the image to permanently adhere to the support surface.

In another well known type of system utilizing an expendable type plate as, for example, a commercially marketed plate of zinc oxide in a suitable binder, the powder image is formed and fused directly thereon. Therefore, for the purposes of illustration, the invention will be described in connection with the reusable type of xerographic plate in which the transferred image is to be fused to a secondary support surface. It is to be understood, however, that the fusing apparatus of the invention has utility with any form of web surface on which the image is contained including the expendable type xerographic plate.

The xerographic apparatus described herein typically may be of the type disclosed in copending application, Serial No. 837,173, filed August 31, 1959, in the names of the A. J. Cerasani et al. and now U.S. Patent No. 3,076,392. Opaque copy to be reproduced is placed on a support tray 10 from which it is fed onto a transport mechanism generally designated 11. Suitable drive means are provided for the transport mechanism from motor 12 to endless belts 13 whereby copy is moved past the optical axis of projection lens system 14 and illuminated by a projection lamp LMP–1. The image of the copy is reflected by mirror 15 through an adjustable objective lens 16 and then reflected by mirror 17 downwardly through a variable slit aperture assembly 18 and onto the surface of a xerographic plate in the form of drum 19.

Xerographic drum 19 includes a cylindrical member mounted in suitable bearings in the frame of the machine and is driven in a clockwise direction by a motor 24 at a constant rate that is proportional to the transport rate of the copy, whereby the peripheral rate of the drum surface is identical to the rate of movement of the reflected light image. The drum surface comprises a layer of photoconductive material on a conductive backing that is sensitized prior to exposure by means of a corona generating device 25 energized from a suitable high potential source.

The exposure of the drum to the light image discharges the photoconductive layer in the areas struck by light, whereby there remains on the drum a latent electrostatic image in image configuration corresponding to the light image projected from the copy. As the drum surface continues its movement, the electrostatic latent image passes through a developing station 26 at which a two-component developing material 27, which may be of the type disclosed in U.S. Patents 2,618,552 and 2,638,416, is cascaded over the drum surface by means of developing apparatus 28 which may be of the type disclosed in copending application, Serial No. 393,058, filed November 19, 1953, in the names of C. R. Mayo et al.

In the developing apparatus, developing material is carried by conveyor 29 driven by suitable drive means from motor 30 and is released onto chute 31 and cascades down over the drum surface. The toner component of the developer is partially consumed in developing. Additional toner 32 is stored in dispenser 33 and is released in amounts controlled by gate 34 to the developer to replenish and assure uniform development.

After developing, the xerographic powder image passes a discharge station 41 at which the drum surface is illuminated by a lamp LMP–2, whereby residual charges on the non-image areas of the drum surface are discharged. Thereafter, the powder image passes through an image transfer station 42 at which the powder image is electrostatically transferred to a support surface web 43 by means of a second corona generating device 44.

The support surface to which the powder image is transferred may be paper, vellum, card stock, etc. The support surface is obtained from a supply roll 45 and is fed over suitably grounded guide rolls 46 and 47, and over suitable tensioning rolls being directed into surface contact with the drum in the immediate vicinity of transfer corona generating device 44. After transfer, the support surface is separated from the drum surface and guided over guide roll 92 and through the fusing apparatus of the invention 50, to be described, whereby the powder image is permanently affixed to the support surface. In most known commercial machines of the type being described, this fusing apparatus has been of the heat fusing type as, for example, disclosed in Crumrine U.S. Patent 2,852,651. Thereafter, the support surface is fed over a further system of guide and tensioning rolls and then onto a take-up roll 52 that is driven by motor 53 or may be passed directly out to a cutter or the like in which the web is cut into severed lengths.

After separation of the support surface from the drum, a corona generating device 54 directs negative electrostatic charge to the residual powder image on the drum surface. Thereafter, the xerographic drum surface passes through a cleaning station 55 at which its surface is brushed by a cleaning brush assembly 56, rotated by a motor 57, whereby residual developing material remaining on the drum is removed. The drum surface then passes through a second discharge station 58 at which it is illuminated by a fluorescent lamp LMP–3, whereby the drum surface in this region is completely flooded with light to remove any electrostatic charge that may remain thereon. Suitable light traps are provided in the system to prevent any light rays from reaching the drum surface, other than the projected image, during the period of drum travel immediately prior to sensitization by corona generating device 25 until after the drum surface is completely passed through the developing station 26.

Figure 2:
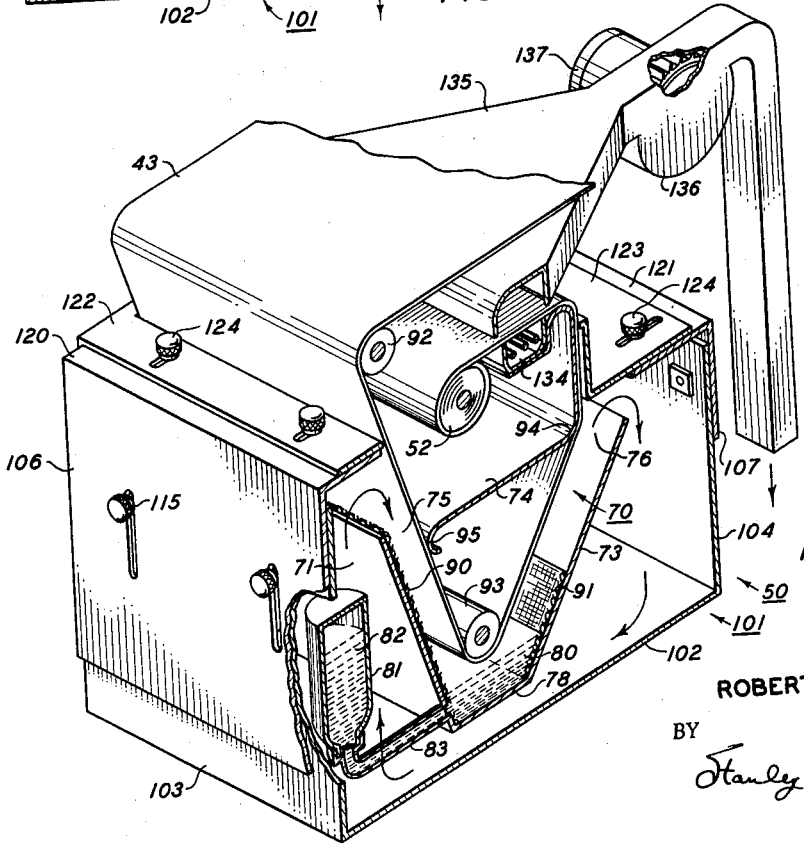
FIG. 2 is an isometric view partially cut away of an embodiment of fusing apparatus in accordance with the invention; and, FIG. 3 is an isometric exterior view of the apparatus.
Figure 3:
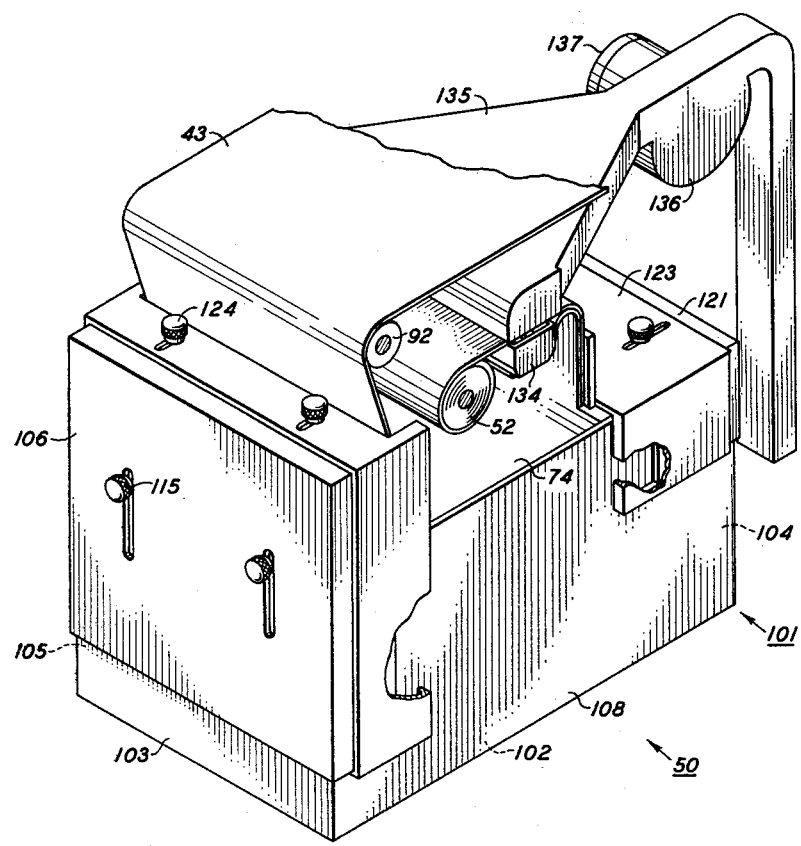

Referring now also to FIGS. 2 and 3, there is illustrated an embodiment of the apparatus of the invention in which a vapor of a solvent of the powder image is effective to affix the powder image to the support web. The solvent employed must of necessity be an easily volatilized solvent for the material constituting the powder image and for obvious reasons should be non-explosive.

The particular solvent employed depends on the nature of the particular image material and/or base on which the image is to be supported. Trichloroethylene is one solvent particularly suited for image material of the type referred to above. Trichloroethylene happens to be characterized by objectionable odor and a degree of toxicity which can raise to an objectionable level if allowed to escape to the room at a high rate. Other suitable solvents include chloroform, carbon tetrachloride, and other chlorinated solvents; the various Freons (believed to be fluorinated lower alkalines); aromatic and aliphatic hydrocarbons such as benzene, toluene, gasoline and gasoline fractions; oxygenated solvents such as ethanol, acetone, ethyl acetate and other alcohols, ketones, esters and the like. In all cases, the particular solvent is appropriately selected for the particular combination of material compositions employed.

The following list taken from various handbooks such as the Handbook of Organic Industrial Solvents, published by the National Association of Mutual Casualty Companies, indicates a summary of allowable maximum concentrations in the atmosphere of sample solvents to maintain the atmosphere below unsafe levels of toxicity. The concentrations are expressed in parts per million (p.p.m.) and as listed include trichloroethylene at 200 p.p.m.; chlorethene at 500 p.p.m.; Freon 112 at 1000 p.p.m.; Freon 11 at 1000 p.p.m.; and Inhibisol at 500 p.p.m. These solvents have each been found to accord various degrees of fusing when used in conjunction with developer of a type described, for example, in Patents 2,618,552; 2,638,416; 2,659,670; 2,753,308; 2,788,288; 2,892,794 and Reissue 25,136 as well as commercially marketed products such as 914 Copier Toner which is a trademark of Xerox Corporation, Rochester, New York. It is not intended, however, that the named solvents should in any way constitute a limitation relevant to the instant invention.

The fuser apparatus 50 is comprised of a vapor chamber 70 through which the web 43 is continuously passed and a shroud 101 surrounding the chamber. The chamber is constructed substantially vapor-tight, at least along its lower section, and is formed of a front wall 71, bottom wall 78, and an upwardly inclined rear wall 73. The sides are closed off by the side walls of the shroud to be described. Approximately in the top center of the chamber is a top plate 74 which with front wall 71 and rear wall 73 define entrance and exit openings 75 and 76, respectively, through which the web enters and emerges from the chamber.

The relationship of the bottom wall 78 between the front and rear walls 71 and 73 forms a liquid-tight pocket constituting a liquid reservoir 80 for containing liquid solvent 82 for the solvent soluble component of the powder image to be fused. Since a certain quantity of solvent is consumed in the process of fusing, the level of solvent is maintained substantially level and constant by means of a solvent dispenser bottle 81 which flows solvent to the reservoir 80 via conduit 83 connected in the reservoir 80 below the liquid level.

The generation of vapor within the chamber is effected by means of solvent wicks 90 and 91, formed of felt, cloth, blotting paper or the like supported against the sloping side of rear wall 73 and along the vertical side of front wall 71, respectively. The lower end of each wick is rolled into a wad at the bottom of the reservoir to draw up solvent in the wick and generate a vapor atmosphere along the path of movement of web 43 moving therepast. As will be noted, wick 90 extends to substantially the top of the front wall while wick 91 extends only partially up the rear wall as to minimize vapor generation near the exit.

As the web continues to advance from transfer station 42, as described in connection with FIG. 1, it passes first over guide roll 92 then through entrance 75, over guide roll 93, and then up onto the take-up roll 52. As it enters the chamber, it is angled rearwardly and guided by turned-over lip 95 on top plate 74 and is guided out at exit 76 by a reverse lip 94. Inbetween, the web is caused to pass through the chamber containing a saturated atmosphere of the vapor of the solvent 82. As can be seen, the web passes with the image bearing surface facing toward the wick members to effect maximum exposure to the vaporized solvent.

Surrounding the chamber from above the entrance extending about and along the bottom and then upward to the exit is a shroud member 101. The shroud is formed of a flat supporting bottom wall 102, front and rear walls 103 and 104, respectively, and side walls 105 and 108 forming a substantially vapor-tight installation at least along the bottom section. Both the front and rear walls contain adjustable vertical extensions 106 and 107, respectively, for reasons as will be understood, and which terminate in horizontal and vertical flanges 120 and 121. In turn, each horizontal flange supports movable slides 122 and 123, respectively, adapted to slide over the flange of the vertical extensions. The extensions are each slotted to receive thumb screws and nuts 115, while the top slides are similarly slotted to receive thumb screws and corresponding nuts 124.

By loosening the thumb screws 115, the height of the front and rear extensions 106 and 107 can be accurately set to any desired position for reasons as will be understood. Similarly, by loosening the thumb screws 124, the horizontal slides 122 and 123 can be extended into close proximity with the path of movement of the web 43. As will be understood, it is desirable in accordance with the invention to obtain controlled closeness between the edge of the horizontal slides and the surface of the web without actually disturbing the powder image supported thereon.

Most of the solvents conventionally employed for fusing of powder images, including those named above, have densities when vaporized which are heavier than air. Trichloroethylene, for example, is approximately five times as heavy as air under standard atmospheric conditions of pressure and temperature. Thus the vapor generated in an unsealed chamber in a normal undisturbed state reaches a level of substantial equilibrium along the bottom of the chamber such that in the absence of agitation, very little of the vapor escapes to the surrounding ambient atmosphere. Vapor escape will decrease inversely with an increase in height of the chamber. However, as a result of a web moving therethrough, a viscous linkage is formed between the gas and the moving web, which vapor is caused to be agitated such that along the web, a film of vapor is accelerated to a velocity asymptotically approaching that of the web. This will vary as a function of web surface characteristics such as roughness, vapor temperature, viscosity, etc. The transfer of momentum because of the kinetic or thermal motion causes this film of vapor to travel with the web and emerge from the chamber as dragout. Dragout vapor could and has in the past caused excessive and highly objectionable dilution to the surrounding atmosphere. Dragout of solvent, comprising the accelerated layer in close proximity to the web surface, represents inefficient use of the solvent material since its consumption produces little and possibly no fusing effect in effecting the ultimate bonding of the powder image to the support web. It is therefore to be distinguished from the solvent absorbed into the powder image and web, that is effective to produce the bonding and which is inherently still contained in the web and image on emergence from the chamber.

It has been found that the vapor film comprising the dragout exists in a layer extending away a slight distance from the image surface. This, of course, varies as a function of web surface characteristics, vapor viscosity, temperature, etc. Therefore, by setting the shroud slide 123 at a practical distance just out of contact with the front surface of the image material, the dragout layer is substantially intercepted and prevented from continuing out into the atmosphere. Further by changing the direction of the moving web, some of the more loosely adhering dragout is also intercepted since the vapor extending further from the image surface tends to maintain its directional course.

That dragout vapor which tends to emerge vertically upward from the chamber impinges against the underside of the slide to lose its momentum. By virtue of its density, the impinged vapor deflects downward into the confines of the shroud until the shroud builds up a substantially saturated atmosphere of solvent vapor. On reaching the latter condition, it has been found that a balance is soon attained in which a like amount of vapor deflected into the shroud at the chamber exit will circulate through the shroud to re-enter the chamber at the entrance 75. This then produces a continuous recirculation of vapor within the shroud such that the vapor passes from the chamber exit 76, through the shroud and then is returned to the chamber. Keeping slide 122 close to the web surface without disturbing the powder image has been found to enhance return of the vapor to the chamber. Its degree of spacing, however, is not as functionally important as that of slide 123. The height positions of side extensions 106 and 107 should be adequately above the chamber as not to impede the flow of vapor between the shroud and the vapor chamber.

It should be apparent that the size of elements forming the apparatus is determined by various factors including dimensions of the image supporting web, solvent employed, rate of web movement, developer composition, etc. Minimum width of the apparatus may be a function of web width although wider fusers may be employed with narrower webs while the height of the fusing chamber and web path length within the chamber may be controlled by the choice of solvent, speed of web transport, developer material or the like. Typically, it has been found that for 11 inch web at speeds of 20 feet per minute, employing developer as described in Carlson Reissue 25,136 and with trichloroethylene as the solvent, images can be fused in approximately 1½ seconds of exposure. Also the materials of construction should preferably not be subjected to chemical attack with the solvent employed. For trichloroethylene, various materials such as stainless steel and nylon have been found suitable.

By means of the invention, therefore, substantially only that solvent absorbed in the image material and to a minor degree the web, if an absorbent material, is removed from the chamber. This absorbed solvent which does leave the chamber can be prevented from diluting the atmosphere by passing the web under a thermocouple controlled heating platen 134 energized from a suitable potential source to dry the web of solvent. On heating, the absorbed solvent is vaporized and is captured in an exhaust duct 135 from which it is discharged harmlessly elsewhere via blower 136 driven by a motor 137. It is to be noted that heat, as here employed, is not essential to the invention and further that the temperature and thermo-energy consumption is far less than required for heat fusing in the absence of vapor. For example, although not in any way to be regarded as a limitation, a web temperature of about 70 degrees Fahrenheit is adequate to drive off condensed vapor of trichloroethylene whereas for heat fusing, the web attains a temperature on the order of approximately 240 degrees F.

Reduced dragout, in accordance with the invention, has resulted not only in a much lower dilution to the atmosphere, reducing ventilation requirements, annoyant odors, etc., but also the consumption of solvent attributable per unit of surface being fused has been found to be substantially reduced. Thus by means of the instant invention ambient toxicity is so substantially reduced below safe levels, that vapor fusing may now be used on commercial equipment more readily and more safely and in a more economical manner. This increased efficiency, therefore, produces both economic and comfort advantages not enjoyed by the prior art devices such as to provide a vapor fuser adapted for continuous operation with a moving web.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A vapor fusing apparatus for fixing a powder image having a solvent soluble component to the surface of a moving web comprising in combination:
   (a) walls arranged contiguously forming a generally enclosed fusing chamber having an entrance and exit opening along an upper surface through which a web supporting a powder image passes into and out of said chamber;
   (b) vapor generating within said fusing chamber means to generate a vapor heavier than air of a solvent of the solvent soluble component of the powder image on the web; and,
   (c) control means to control vapor dragout to the ambient atmosphere by the moving web of vapors accelerated along the surface of the moving web, said control means comprising plate means supported juxtaposed to the image surface on the web exiting from said fusing chamber to intercept the accelerated vapors and walls arranged contiguously forming a second chamber extending at least partially surrounding said fusing chamber to provide a circulation duct for vapor intercepted by said plate means to recirculate vapors to said fusing chamber whereby dragout of the accelerated vapors to the ambient atmosphere is substantially avoided.

2. A vapor fusing apparatus for fixing a powder image having a solvent soluble component to the surface of a moving web comprising in combination:
   (a) walls arranged contiguously foming a generally enclosed fusing chamber having an entrance and exit opening along an upper surface through which a web supporting a powder image passes into and out of said chamber;
   (b) vapor generating means to generate in said chamber a vapor heavier than air of a solvent of the solvent soluble component of the powder image on the web; and,
   (c) walls arranged contiguously forming a generally enclosed shroud extending about at least the lower portion of said chamber from a position juxtaposed to the image surface on the web emerging above said exit to a near spaced relation to the surface of the entering web above said entrance, whereby vapor accelerated by the movement of web along said web surface is largely intercepted to be recycled from said exit through said shroud into the entrance of said chamber.

3. The apparatus according to claim 2 in which said shroud includes adjustably settable means adapted to vary the spacing between the shroud and the web surface independently at said entrance and exits of said chamber.

4. The apparatus according to claim 2 in which said shroud includes adjustably settable means adapted to vary the distance of said shroud independently above said entrance and exit of said chamber.

5. The apparatus according to claim 2 in which said shroud includes adjustably settable means adapted to vary the spacing between the shroud and the web surface independently at said entrance and exit of said chamber, and adjustably settable means adapted to vary the distance of said shroud independently above said entrance and exit of said chamber.

6. In a xerographic apparatus comprising means to continuously advance a web support surface and fusing means for fixing a powder image to the surface of a moving web, the improvement comprising improved fusing means, said improved fusing means comprising in combination:
   (a) walls arranged contiguously forming a generally enclosed chamber located along the path of web movement and having an entrance and exit opening along an upper surface through which a web supporting a powder image having a solvent soluble component passes into and out of said chamber,
   (b) vapor generating means to generate in said chamber a vapor heavier than air of a solvent of the solvent soluble component of the powder image on the web; and,
   (c) walls arranged contiguously forming a generally enclosed shroud extending about at least the lower portion of said chamber from a position juxtaposed to the image surface on the web emerging above said exit to a near spaced relation to the surface of the entering web above said entrance, whereby vapor accelerated by the movement of web along said web surface is largely intercepted to be recycled from said exit through said shroud into the entrance of said chamber.

7. In a vapor fusing apparatus for fixing a powder image having a solvent soluble component to the surface of a moving web and including walls arranged contiguously forming a generally enclosed fusing chamber having an entrance and exit opening along an upper surface through which a web supporting a powder image passes into and out of said chamber and vapor generating means to generate in said chamber a vapor heavier than air of a solvent of the solvent soluble component of the powder image on the web, the improvement comprising walls arranged contiguously forming a generally enclosed shroud extending about at least the lower portion of said chamber from a position juxtaposed to the image surface on the web emerging above said exit to a near spaced relation to the surface of the entering web above said entrance, whereby vapor accelerated by the movement of web along said web surface is largely intercepted to be recycled from said exit through said shroud into the entrance of said chamber.

8. A vapor fusing apparatus for fixing a powder image onto a continuously moving web support surface comprising in combination:
(A) a vapor chamber comprising:
  (a) walls arranged contiguously forming a vertically extending enclosure having an entrance and an exit along an upper surface through which a continuously moving web supporting a powder containing a solvent soluble component enters and exits, respectively, to and from said chamber;
  (b) directional guide means in said chamber to guide the portion of web within said chamber in a predetermined path between said entrance and said exit;
  (c) a solvent reservoir formed at the bottom of said enclosure containing liquid of the solvent of a solvent soluble component of the powder supported on a web moving therethrough; and,
  (d) wick members immersed at one end in the liquid solvent in said reservoir and extending upwardly therefrom generally parallel below and along the length of path of web moving through said chamber to generate an atmosphere of solvent vapor heavier than air from the vicinity of said entrance toward the vicinity of said exit; and,
(B) a shroud adapted to control vapor dragout associated with a layer of vapor accelerated along the surface of the moving web emerging from said chamber at the exit thereof, said shroud comprising:
  (a) walls arranged contiguously forming a second enclosure at least partially surrounding said vapor chamber and spaced therefrom a distance to permit free circulation of solvent vapor therebetween; and,
  (b) panels on said second enclosure arranged above the entrance and exit of said chamber and adjustable to minimum clearance to the powder supported on a web entering and exiting from said chamber, said panel at said exit being positioned to predominantly deflect the layer of vapor dragout downward to circulate between said second enclosure and the exterior of said vapor chamber whereby the deflected vapor on forming a saturated atmosphere of vapor therein circulates through said space between said first and second enclosures into the entrance of said chamber.

References Cited in the file of this patent
UNITED STATES PATENTS
2,776,907  Carlson _____ Jan. 8, 1957

UNITED STATES PATENT OFFICE
CERTIFICATE OF CORRECTION

Patent No. 3,149,931

September 22, 1964

Robert W. Gundlach

It is hereby certified that error appears in the above numbered patent requiring correction and that the said Letters Patent should read as corrected below.

Column 7, line 53, strike out "within said fusing chamber" and insert the same after "generate" in line 54, same column 7.

Signed and sealed this 6th day of April 1965.

(SEAL)
Attest:

ERNEST W. SWIDER
Attesting Officer

EDWARD J. BRENNER
Commissioner of Patents